(12) United States Patent
Drzymala et al.

(10) Patent No.: US 8,910,873 B2
(45) Date of Patent: Dec. 16, 2014

(54) METHOD AND APPARATUS FOR DEFINING ILLUMINATION FIELD OF VIEW OF BARCODE READER

(75) Inventors: Mark Drzymala, Commack, NY (US); Joseph Giordano, Bayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 720 days.

(21) Appl. No.: 12/494,471

(22) Filed: Jun. 30, 2009

(65) Prior Publication Data

US 2010/0327067 A1    Dec. 30, 2010

(51) Int. Cl.
*G06K 7/10*    (2006.01)

(52) U.S. Cl.
CPC ................................. *G06K 7/10792* (2013.01)
USPC .................. 235/462.43; 235/454; 235/462.01

(58) Field of Classification Search
USPC .......... 235/435, 454, 462.01, 462.41–462.45, 235/472.01
See application file for complete search history.

(56) References Cited

U.S. PATENT DOCUMENTS

| | | | |
|---|---|---|---|
| 5,521,366 A * | 5/1996 | Wang et al. .................... | 235/454 |
| 6,060,722 A | 5/2000 | Havens et al. | |
| 6,340,114 B1 | 1/2002 | Correa et al. | |
| 6,359,652 B1 * | 3/2002 | Takada ........................... | 348/374 |
| 6,601,768 B2 * | 8/2003 | McCall et al. ............. | 235/462.42 |
| 6,637,657 B2 * | 10/2003 | Barkan et al. ............. | 235/462.43 |
| 7,533,824 B2 * | 5/2009 | Hennick et al. ........... | 235/462.45 |
| 2007/0108284 A1 * | 5/2007 | Pankow et al. ................. | 235/454 |
| 2007/0164111 A1 | 7/2007 | Wang et al. | |
| 2008/0156876 A1 | 7/2008 | Vinogradov | |
| 2008/0164315 A1 * | 7/2008 | Pankow ...................... | 235/462.42 |
| 2008/0290171 A1 * | 11/2008 | Vinogradov ............... | 235/462.06 |
| 2009/0127342 A1 * | 5/2009 | Giebel et al. .............. | 235/462.42 |
| 2009/0159685 A1 * | 6/2009 | Shi et al. ................... | 235/462.42 |
| 2010/0155487 A1 * | 6/2010 | Liu et al. ................... | 235/462.42 |
| 2010/0219248 A1 * | 9/2010 | Barkan et al. ............. | 235/462.42 |

OTHER PUBLICATIONS

International Search Report and Written Opinion dated Oct. 7, 2010 in related case PCT/US2010/039816.
International Preliminary Report on Patentability and Written Opinion for International Patent Application No. PCT/US2010/039816 mailed Jan. 12, 2012.
Office Action mailed Sep. 28, 2012 for counterpart European Patent Application No. EP10736883.9.

* cited by examiner

*Primary Examiner* — Thien M Le
*Assistant Examiner* — April Taylor
(74) *Attorney, Agent, or Firm* — Nong-Qiang Fan

(57) ABSTRACT

A method and apparatus for defining the illumination field of view of a barcode reader. The method includes (1) generating an illumination with an illumination source; (2) directing the illumination with an illumination lens to pass through an aperture to generate an illumination pattern directed toward a target object and to define an illumination field of view with the aperture; and (3) focusing light reflected from the target object onto a photosensor array with an imaging lens in an imaging system.

18 Claims, 7 Drawing Sheets

METHOD AND APPARATUS FOR DEFINING ILLUMINATION FIELD OF VIEW OF BARCODE READER

FIELD OF THE DISCLOSURE

The present disclosure relates generally to imaging-based bar code readers.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include charge coupled device (CCD) arrays, complementary metal oxide semiconductor (CMOS) arrays, or other imaging pixel arrays having a plurality of photosensitive elements (photosensors) or pixels. An illumination apparatus or system comprising light emitting diodes (LEDs) or other light source directs illumination toward a target object, e.g., a target bar code. Light reflected from the target bar code is focused through a system of one or more lens of the imaging system onto the pixel array. Thus, the target bar code within a field of view (FV) of the imaging lens system is focused on the pixel array.

Periodically, the pixels of the array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

As mentioned above, imaging-based bar code readers typically employ an illumination apparatus to flood a target object with illumination from a light source such as a light emitting diode (LED) in the reader. Light from the light source or LED is reflected from the target object. The reflected light is then focused through the imaging lens system onto the pixel array, the target object being within a field of view of the imaging lens system.

The illumination system is designed to direct a pattern of illumination toward a target object such that the illumination pattern approximately matches the field of view (FV) of the imaging system. In some of the illumination systems, however, illumination intensity of the illumination pattern may not be very uniform, especially near the edges of the illumination pattern. It is desirable to have an illumination pattern that has substantially uniform illumination intensity within the entire illumination pattern. It is also desirable to have an illumination pattern with sharply defined edges.

Accordingly, there is a need for improved methods and apparatus for defining the illumination field of view of the barcode readers.

SUMMARY

In one aspect, the invention is directed to a barcode reader. The barcode reader includes an illumination source for generating an illumination and an aperture for defining an illumination field of view. The barcode reader also includes an illumination lens and an imaging system. The illumination lens is deposited between the illumination source and the aperture for directing the illumination from the illumination source through the aperture to generate an illumination pattern directed toward a target object. The imaging system includes a photosensor array and an imaging lens for focusing light reflected from the target object onto the photosensor array.

In another aspect, the invention is directed to a method. The method includes (1) generating an illumination with an illumination source; (2) directing the illumination with an illumination lens to pass through an aperture to generate an illumination pattern directed toward a target object and to define an illumination field of view with the aperture; and (3) focusing light reflected from the target object onto a photosensor array with an imaging lens in an imaging system.

Implementations of the invention can include one or more of the following advantages. The illumination pattern generated by the aperture can have sharply defined edges that can be used to let the user know where the field of view of the imaging system is located.

These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
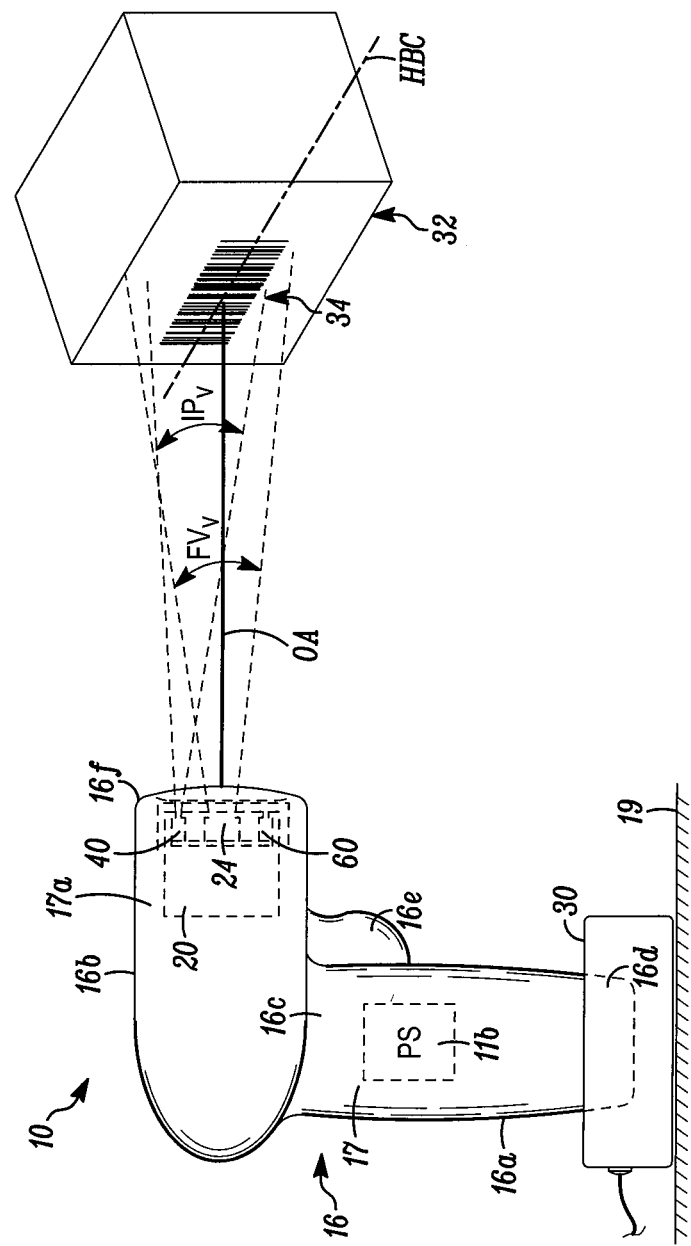
FIG. 1 is a schematic side elevation view of an exemplary embodiment of an imaging-based bar code reader of the present invention.
Figure 2:
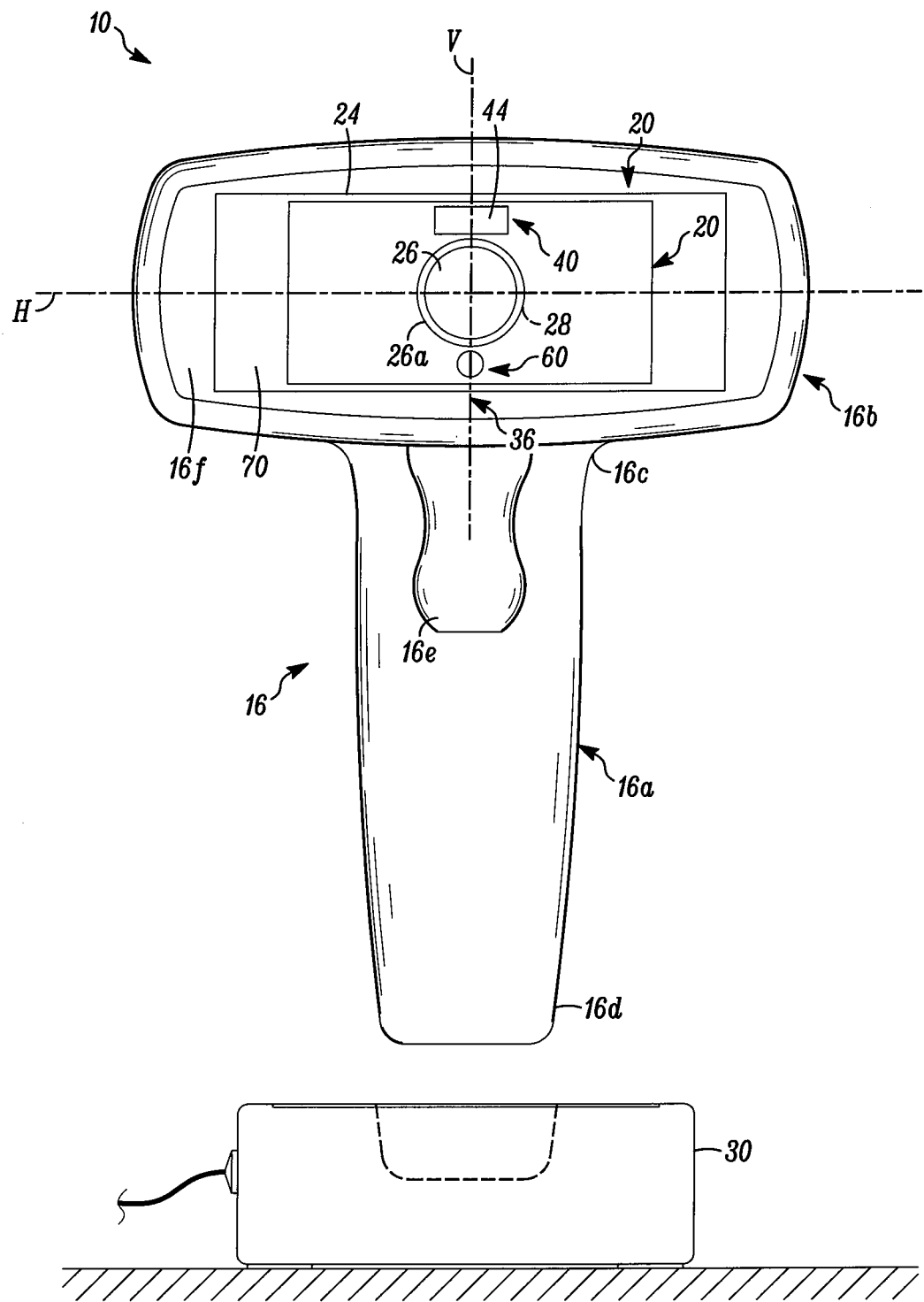
FIG. 2 is a schematic front elevation view of the bar code reader of FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An exemplary embodiment of an imaging-based bar code reader of the present invention is shown schematically at 10 in FIGS. 1-5. The bar code reader 10 includes an imaging system 12 and a decoding system 14 mounted in a housing 16. The reader 10 is capable of reading, that is, imaging and decoding bar codes. The imaging system 12 is adapted to capture image frames of a field of view FV of the imaging system 12 arid the decoding system 14 is adapted to decode encoded indicia within a captured image frame. The housing 16 supports circuitry 11 of the reader 10 including the imaging and decoding systems 12, 14 within an interior region 17 of the housing 16.

The imaging system 12 comprises a scan engine or imaging camera assembly 20 and associated imaging circuitry 22. The imaging camera assembly 20 includes a housing 24 supporting focusing optics including one or more imaging lens 26 and a photosensor or pixel array 28. The sensor array 28 is enabled during an exposure period to capture an image of a target object 32 within a field of view FV of the imaging system 12. The field of view FV of the imaging system 12 is a function of both the configuration of the sensor array 28 and the optical characteristics of the imaging lens 26 and the distance and orientation between the array 28 and the imaging lens 26. In one exemplary embodiment, the imaging system 12 is a linear or one dimensional imaging system and the sensor array 28 is a linear or 1D sensor array.

Figure 3:
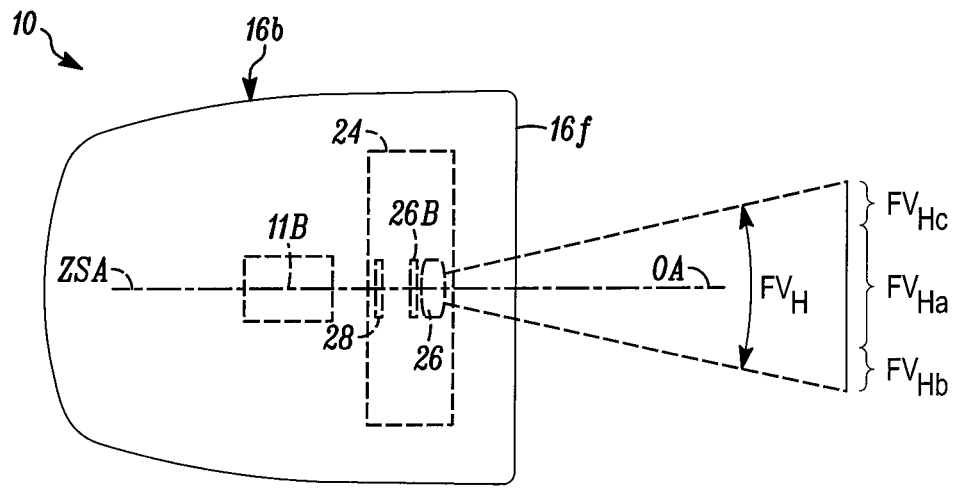
FIG. 3 is a schematic top plan view of the bar code reader of FIG. 1.
Figure 4:
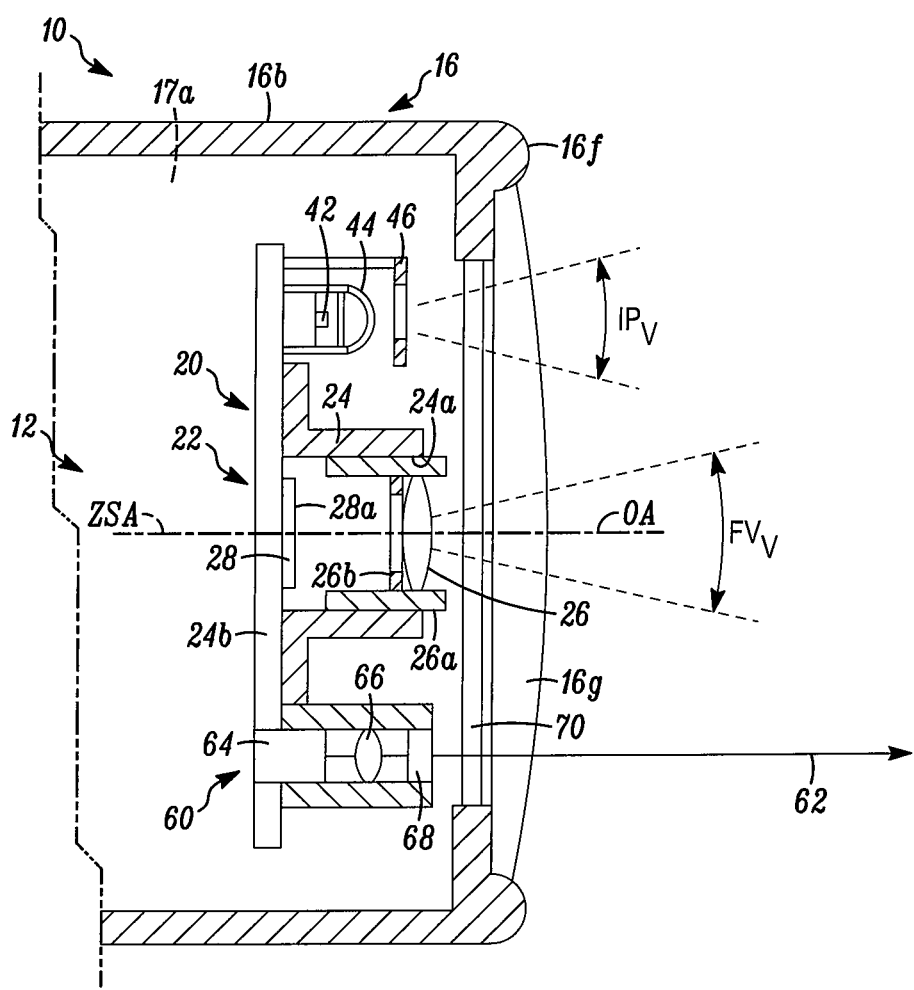
FIG. 4 is a schematic view partly in section and partly in side elevation of a camera assembly of an imaging assembly of the bar code reader of FIG. 1.
Figure 5:
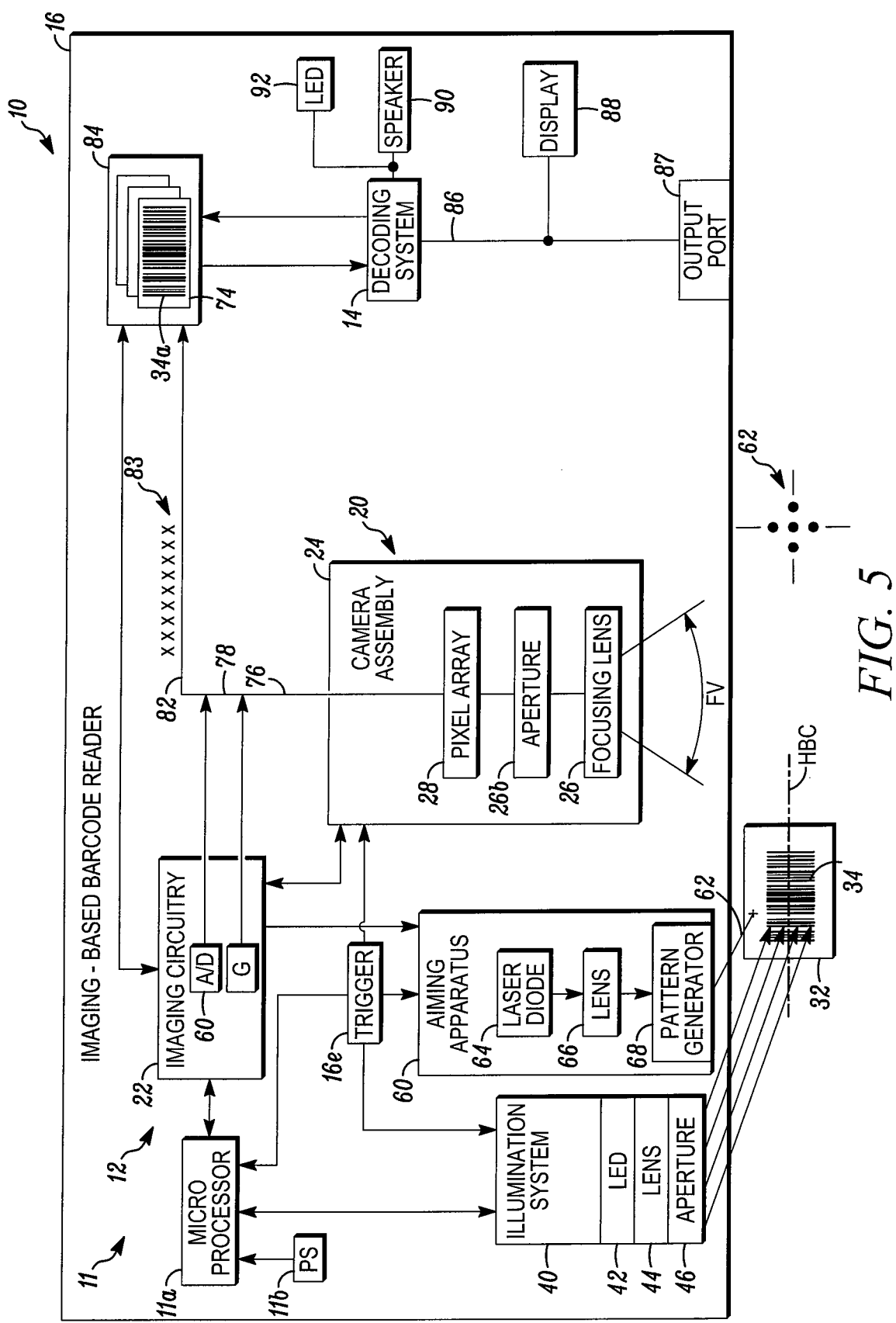
FIG. 5 is a schematic block diagram of the bar code reader of FIG. 1.

The imaging system 12 field of view FV (shown schematically in FIG. 5) includes both a horizontal and a vertical field of view, the horizontal field of view being shown schematically as FVH in FIG. 3 and the vertical field of view being shown schematically as FVV in FIGS. 1 and 4. The linear sensor array 28 is primarily adapted to image ID bar codes, for example, a UPC bar code as shown in FIG. 1 which extends along a horizontal axis HBC and includes one row of indicia, an array of dark bars and white spaces. However, one of skill in the art would recognize that the present invention is also applicable to imaging systems utilizing a 2D photosensor array to image 2D bar codes, postal codes, signatures, etc.

The housing 16 includes a gripping portion 16a adapted to be grasped by an operator's hand and a forward or scanning head portion 16b extending from an upper part 16c of the gripping portion 16a. A lower part 16d of the gripping portion 16a is adapted to be received in a docking station 30 positioned on a substrate such as a table or sales counter. The scanning head 16b supports the imaging system 12 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 30 and a target object 32 having a target bar code 34 (FIG. 1) is brought within the field of view FV of the reader's imaging system 12 in order to have the reader 10 read the target bar code 34. The imaging system 12 is typically always on or operational in the fixed position mode to image and decode any target bar code presented to the reader 10 within the field of view FV. The docking station 30 is plugged into an AC power source and provides regulated DC power to circuitry 11 of the reader 10. Thus, when the reader 10 is in the docking station 30 power is available to keep the imaging system 12 on continuously.

In the hand-held mode, the housing 14 is removed from the docking station 30 so the reader 10 can be carried by an operator and positioned such that the target bar code 34 is within the field of view FV of the imaging system 12. In the hand-held mode, imaging and decoding of the target bar code 34 is instituted by the operator depressing a trigger 16e extending through an opening near the upper part 16c of the gripping portion 16a.

The imaging system 12 is part of the bar code reader circuitry 11 which operates under the control of a microprocessor 11a. When removed from the docking station 30, power is supplied to the imaging and decoding systems 12, 14 by a power supply 11b. The imaging and decoding systems 12, 14 of the present invention may be embodied in hardware, software, electrical circuitry, firmware embedded within the microprocessor 11a or the scan engine 20, on flash read only memory (ROM), on an application specific integrated circuit (ASIC), or any combination thereof.

The bar code reader 10 includes an illumination apparatus or system 40, described more fully below, to illuminate the target bar code 34 and an aiming system 60 which generates a visible aiming pattern 62 (FIG. 5) to aid the operator in aiming the reader 10 at the target bar code 34 when using the reader in the hand-held mode. The aiming system 60 generates the visible aiming pattern 62 comprising a single dot of illumination, a plurality of dots and/or lines of illumination or overlapping groups of dots/lines of illumination. The aiming system 60 typically includes a laser diode 64, a focusing lens 66 and a pattern generator 68 for generating the desired aiming pattern 62.

The camera housing 24 is supported within the scanning head interior region 17a in proximity to a transparent window 70 defining a portion of a front wall 16f of the scanning head 16b. The window 70 is oriented such that its horizontal axis is substantially parallel to the scanning head horizontal axis H and its vertical axis is substantially parallel to the scanning head vertical axis V. Reflected light from the target bar code 34 passes through the transparent window 70, is received by the focusing lens 26 and focused onto the imaging system sensor array 28. In one embodiment, the illumination apparatus 40 and the aiming assembly 60 may be positioned behind the window 70. Illumination from the illumination apparatus 40 and the aiming pattern 62 generated by the aiming assembly 60 also pass through the window 70.

The imaging circuitry 22 may be disposed within, partially within, or external to the camera assembly housing 24. The imaging lens 26 (which may be a single lens or series of lenses) are supported by a lens holder 26a. The camera housing 24 defines a front opening 24a that supports and seals against the lens holder 26a so that the only light incident upon the sensor array 28 is illumination passing through the imaging lens 26.

Depending on the specifics of the camera assembly 20, the lens holder 26a may slide in and out within the camera housing front opening 24a to allow dual focusing under the control of the imaging circuitry 22 or the lens holder 26a may be fixed with respect to the camera housing 25 in a fixed focus camera assembly. The lens holder 26a is typically made of metal. A back end of the housing 24 may be comprised of a printed circuit board 24b, which forms part of the imaging circuitry 22 and extends vertically to also support the illumination apparatus 40 and the aiming apparatus 60 (best seen in FIG. 4).

The imaging system 12 includes the linear sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a linear pixel CCD or CMOS array with a one row of pixels. The number of pixels in the row typically would be 512, 1024, 2048 or 4096 pixels. The typical size of a pixel in the pixel array would be on the order of 7 microns in horizontal width .times.120 microns in vertical height.

The illumination-receiving pixels of the pixel array define a sensor array surface 28a (best seen in FIG. 4). The pixel array 28 is secured to the printed circuit board 24b, in parallel direction for stability. The sensor array surface 28a is substantially perpendicular to an optical axis OA of the focusing lens 26, that is, a z axis (labeled ZSA in FIG. 4) that is perpendicular to the sensor array surface 28a would be substantially parallel to the optical axis OA of the focusing lens 26. The pixels of the sensor array surface 28a are disposed substantially parallel to the horizontal axis H of the scanning head 16b.

As is best seen in FIG. 4, the focusing lens 26 focuses light reflected and scattered from the target bar code 34 through an aperture 26b onto the sensor array surface 28a of the pixel/photosensor array 28. Thus, the focusing lens 26 focuses an image of the target bar code 34 (assuming it is within the field of view FV) onto the array of pixels comprising the pixel array 28. When actuated to read the target bar code 34, the imaging system 12 captures a series of image frames 74 which are stored in a memory 84. Each image frame 74 includes an image 34a of the target bar code 34 (shown schematically in FIG. 5). The decoding system 14 decodes a digitized version of the image bar code 34a.

Electrical signals are generated by reading out of some or all of the pixels of the pixel array 28 after an exposure period. After the exposure time has elapsed, some or all of the pixels of pixel array 28 are successively read out thereby generating an analog signal 76 (FIG. 4). In some sensors, particularly CMOS sensors, all pixels of the pixel array 28 are not exposed at the same time, thus, reading out of some pixels may coincide in time with an exposure period for some other pixels.

The analog image signal 76 represents a sequence of photosensor voltage values, the magnitude of each value representing an intensity of the reflected light received by a photosensor/pixel during an exposure period. The analog signal 76 is amplified by a gain factor, generating an amplified analog signal 78. The imaging circuitry 22 further includes an analog-to-digital (A/D) converter 80. The amplified analog signal 78 is digitized by the A/D converter 80 generating a digitized signal 82. The digitized signal 82 comprises a sequence of digital gray scale values 83 typically ranging from 0-255 (for an eight bit processor, i.e., $2.^{8}=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 83 of the digitized signal 82 are stored in the memory 84. The digital values 83 corresponding to a read out of the pixel array 28 constitute the image frame 74, which is representative of the image projected by the focusing lens 26 onto the pixel array 28 during an exposure period. If the field of view FV of the focusing lens 26 includes the target bar code 34, then a digital gray scale value image 34a of the target bar code 34 would be present in the image frame 74.

The decoding circuitry 14 then operates on the digitized gray scale values 83 of the image frame 74 and attempts to decode any decodable image within the image frame, e.g., the imaged target bar code 34'. If the decoding is successful, decoded data 86, representative of the data/information coded in the bar code 34 is then output via a data output port 87 and/or displayed to a user of the reader 10 via a display 88. Upon achieving a good "read" of the bar code 34, that is, the bar code 34 was successfully imaged and decoded, a speaker 90 and/or an indicator LED 92 is activated by the bar code reader circuitry 13 to indicate to the user that the target bar code 34 has successfully read, that is, the target bar code 34 has been successfully imaged and the imaged bar code 34a has been successfully decoded. If decoding is unsuccessful, a successive image frame 74 is selected and the decoding process is repeated until a successful decode is achieved.

Figure 6:
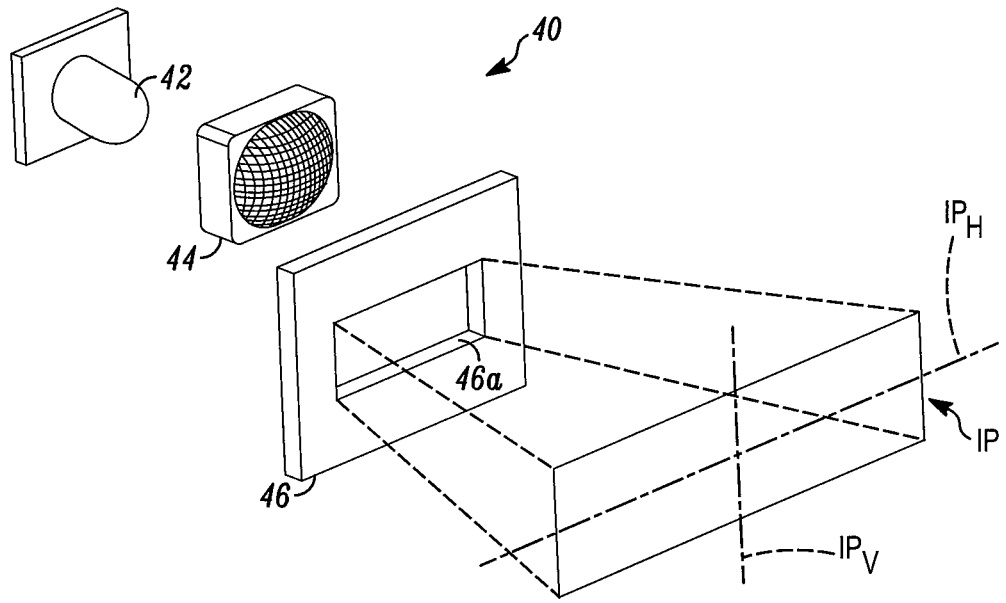
FIGS. 6 and 7 depict an illumination system that includes an aperture having a generally rectangular opening for defining an illumination field of view.
Figure 7:
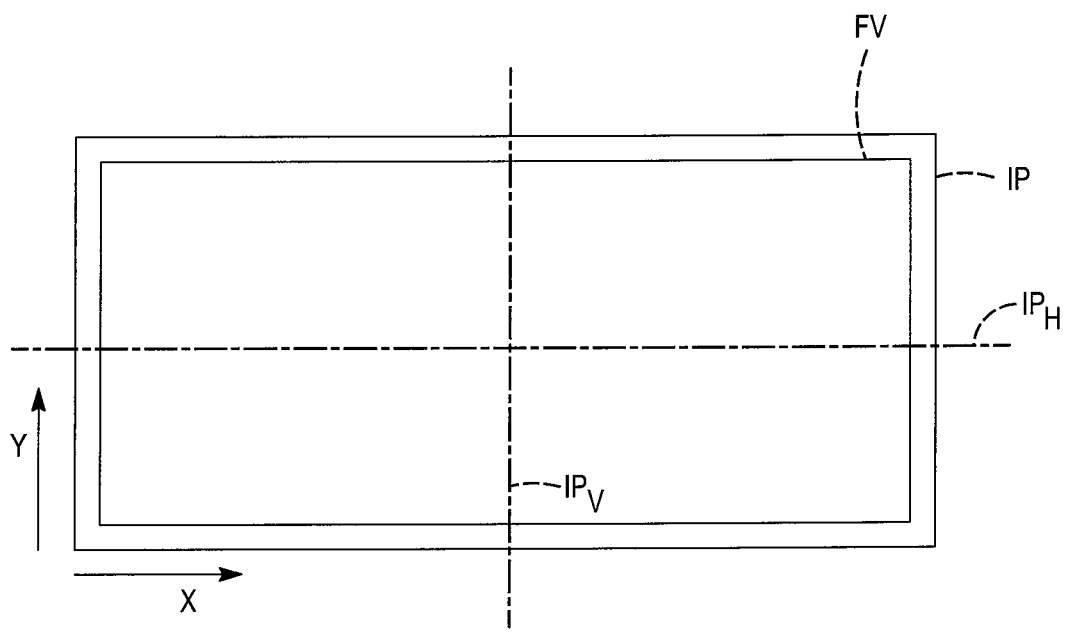

In FIGS. 6 and 7, the illumination system 40 includes an illumination source 42 for generating an illumination and an aperture 46 having a generally rectangular opening 46a for defining an illumination field of view. The illumination source 42 can include one or more LEDs. The illumination source 42 can also be other kinds of light source, such as, a cold cathode lamp (CFL). The illumination system 40 also includes an illumination lens 44 deposited between the illumination source 42 and the aperture 44. The illumination lens 44 directs the illumination from the illumination source 42 through the aperture 46 to generate an illumination pattern IP that fills or substantially coincides with the field of view FV of the imaging system 12. In the exemplary embodiment shown in FIG. 6 and 7, the illumination pattern IP and field of view FV are generally rectangular in shape.

In FIGS. 6 and 7, when the aperture 46 is used to limit the light projected onto the object space by the illumination lens 44, the end effect is an illumination pattern IP with sharply defined edges that may be used to illuminate the object space in addition to functioning as the aiming system letting the user know where the imaging field of view FV is located.

Figure 8A:
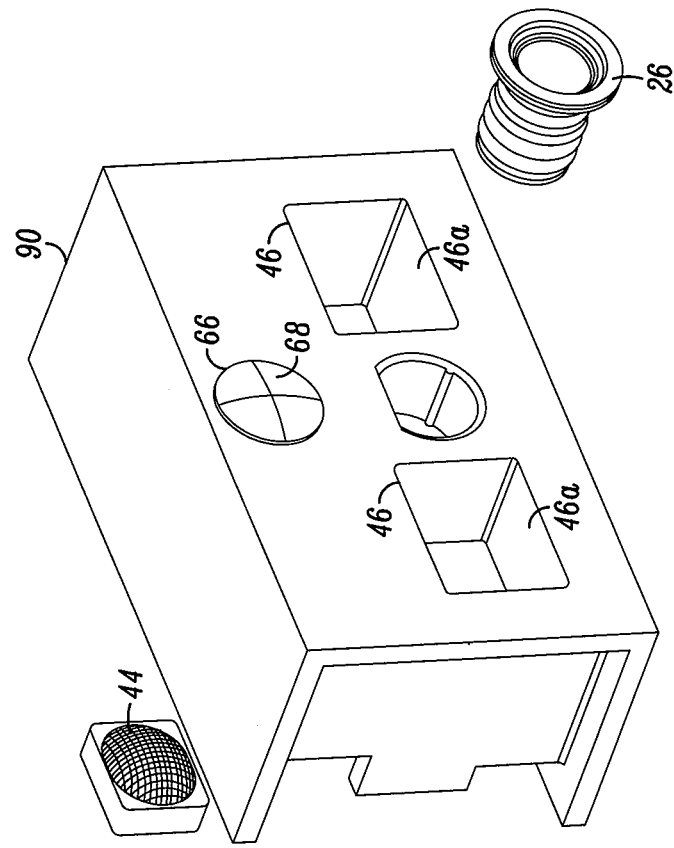
FIGS. 8A and 8B depict a barcode reader that has the illumination source placed on a circuit board and the aperture formed on a chassis.
Figure 8A:
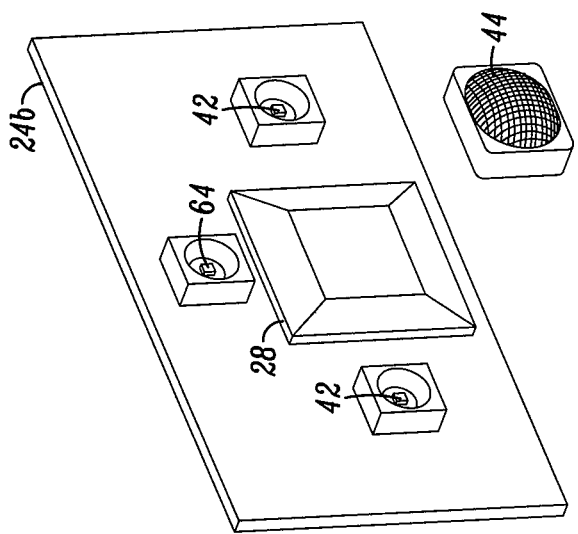
Figure 8B:
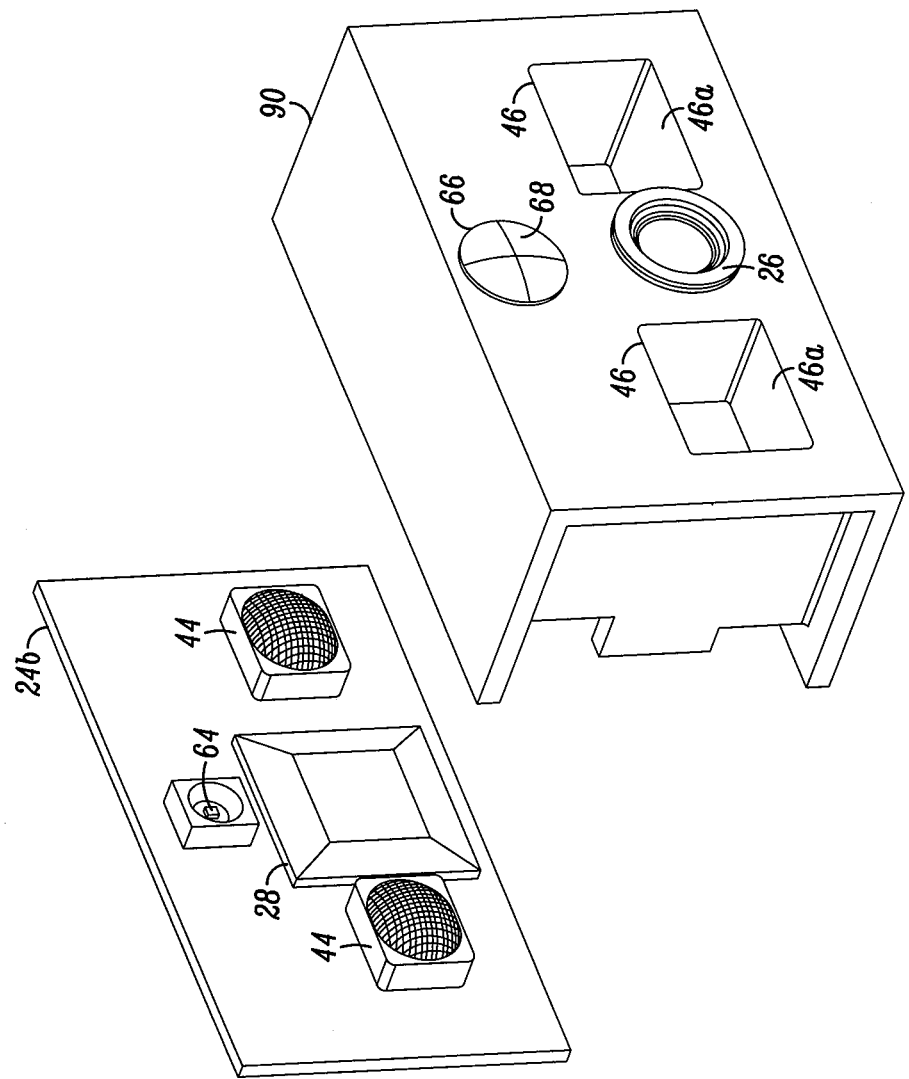

FIGS. 8A and 8B depict a barcode reader that has the illumination source placed on a circuit board and the aperture formed on a chassis. As shown in FIGS. 8A and 8B, the illumination source 42 including two LEDs are placed on a circuit board 24b. The photosensor array 28 for the imaging camera assembly and a diode 64 for the aiming system are also placed on the circuit board 24b. The aperture 46 having the rectangular opening 46a is formed on the chassis 90. In some implementations, the aperture 46 and the chassis 90 can be formed as a single piece during an injecting mold process. In other implementations, the aperture 46 and the chassis 90 can be formed separately, and the separately constructed aperture 46 can be inserted into an opening on the chassis 90.

In FIGS. 8A and 8B, the imaging lens 26 is deposited within the chassis 90 for focusing light reflected from the target object onto the photosensor array 28. In FIGS. 8A and 8B, a focusing lens 66 and a pattern generator 68 for the aiming system are also deposited within the chassis 90. The desired aiming pattern can be generated by the light from the diode 64 passing through the focusing lens 66 and the pattern generator 68. In other implementations, the desired aiming pattern can be generated by a laser diode, and the light from the laser diode can pass through other reflective optical element or diffractive optical element for the aiming system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A barcode reader comprising:
    an illumination source for generating an illumination;
    an aperture for defining an illumination field of view;
    an illumination lens, deposited between the illumination source and the aperture, for directing the illumination from the illumination source through the aperture to generate an illumination pattern directed toward a target object;
    an imaging system including a photosensor array and an imaging lens for focusing light reflected from the target object within an imaging field of view onto the photosensor array;
    a chassis having the aperture formed thereon;
    wherein the imaging lens is deposited on the chassis; and
    wherein a boundary surrounding the illumination pattern as defined by the aperture substantially coincides with the boundary surrounding the imaging field of view of the imaging system, with the boundary surrounding the illumination pattern having a shape that is identical to the shape of the aperture.

2. The barcode reader of claim 1, wherein:
    the illumination source is a light emitting diode.

3. The barcode reader of claim 1, wherein:
    the illumination lens is placed on top of the illumination source.

4. The barcode reader of claim 1, wherein:
    the illumination pattern generated by the aperture is operative to indicate a the boundary of the imaging field of view of the imaging system.

5. The barcode reader of claim 1, further comprising:
    an aiming system including a laser source.

6. The barcode reader of claim 1, further comprising:
an aiming system including a light emitting diode.

7. The barcode reader of claim 1, wherein:
the boundary surrounding the illumination pattern and the aperture are both in the shape of rectangular.

8. A barcode reader comprising:
a circuit board;
an illumination source on the circuit board for generating an illumination;
an aperture for defining an illumination field of view;
an illumination lens, deposited between the illumination source and the aperture, for directing the illumination from the illumination source through the aperture to generate an illumination pattern directed toward a target object;
an imaging system including a photosensor array and an imaging lens for focusing light reflected from the target object within an imaging field of view onto the photosensor array;
a chassis having the aperture formed thereon;
wherein the imaging lens is deposited on the chassis; and
wherein a boundary surrounding the illumination pattern as defined by the aperture substantially coincides with the boundary surrounding the imaging field of view of the imaging system, with the boundary surrounding the illumination pattern having a shape that is identical to the shape of the aperture.

9. The barcode reader of claim 8, wherein:
the illumination source is a light emitting diode.

10. The barcode reader of claim 8, wherein:
the illumination lens is placed on top of the illumination source.

11. The barcode reader of claim 8, wherein:
the illumination pattern generated by the aperture is operative to indicate the boundary of the imaging field of view of the imaging system.

12. The barcode reader of claim 8, wherein both illumination source and the photosensor array are placed on the circuit board.

13. The barcode reader of claim 8, further comprising:
an aiming system including a laser source placed on the circuit board.

14. The barcode reader of claim 8, further comprising:
an aiming system including a light emitting diode placed on the circuit board.

15. The barcode reader of claim 8, wherein:
the boundary surrounding the illumination pattern and the aperture are both in the shape of rectangular.

16. A method comprising:
generating an illumination with an illumination source;
directing the illumination with an illumination lens to pass through an aperture on a chassis to generate an illumination pattern directed toward a target object and to define an illumination field of view with the aperture;
focusing light reflected from the target object within an imaging field of view onto a photosensor array with an imaging lens in an imaging system;
directing the illumination with the illumination lens to pass through the aperture to generate the illumination pattern indicating a boundary of the imaging field of view of the imaging system, with the boundary of the imaging field of view having a shape that is identical to the shape of the aperture.
wherein the chassis comprises a cavity configured to hold the imaging lens.

17. The method of claim 16, further comprising:
transmitting an image data from the photosensor array to a decoding system.

18. The method of claim 16, wherein:
the boundary of the imaging field of view and the aperture are both in the shape of rectangular.

* * * * *